(12) United States Patent  
Bohn et al.

(10) Patent No.: US 7,827,765 B2  
(45) Date of Patent: Nov. 9, 2010

(54) METHOD FOR FORMING A SLIDER RECLOSURE SEGMENT

(75) Inventors: Michael Bohn, Rochester, NY (US); Roger E. Dowler, Rochester, NY (US); Matthew Oswald, Rochester, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 11/975,878

(22) Filed: Oct. 22, 2007

(65) Prior Publication Data

US 2008/0098693 A1    May 1, 2008

Related U.S. Application Data

(60) Provisional application No. 60/854,751, filed on Oct. 27, 2006.

(51) Int. Cl.  
*B65B 61/18* (2006.01)

(52) U.S. Cl. ................. 53/412; 53/450; 53/133.4; 53/139.2

(58) Field of Classification Search ............ 53/412, 53/410, 450, 133.4, 139.2, 451, 550, 551, 53/552; 493/213, 214, 215, 927  
See application file for complete search history.

(56) References Cited

U.S. PATENT DOCUMENTS

| | | | |
|---|---|---|---|
| 3,202,559 A | 8/1965 | LaGuerre | |
| 3,426,396 A | 2/1969 | LaGuerre | |
| 3,554,822 A | 1/1971 | Schwarzkopf | |
| 5,007,143 A | 4/1991 | Herrington | 24/400 |
| 5,010,627 A | 4/1991 | Herrington et al. | 24/400 |
| 5,063,644 A | 11/1991 | Herrington et al. | 24/400 |
| 5,067,208 A | 11/1991 | Herrington, Jr. et al. | 24/400 |
| 5,070,583 A | 12/1991 | Herrington | 24/400 |
| 5,131,121 A | 7/1992 | Herrington, Jr. et al. | 24/436 |
| 5,161,286 A | 11/1992 | Herrington, Jr. et al. | 24/287 |
| 5,431,760 A | 7/1995 | Donovan | 156/66 |
| 5,956,924 A * | 9/1999 | Thieman | 53/412 |
| 6,293,896 B1 * | 9/2001 | Buchman | 493/213 |
| 6,364,530 B1 | 4/2002 | Buchman | 383/64 |
| 6,517,242 B1 | 2/2003 | Buchman | 282/5 |
| 2003/0220179 A1 | 11/2003 | Thieman | 493/114 |
| 2005/0020424 A1 | 1/2005 | Thomas et al. | 493/213 |

FOREIGN PATENT DOCUMENTS

WO    WO 01/70491 A1    9/2001

OTHER PUBLICATIONS

Written Opinion of the International Searching Authority corresponding to co-pending International Patent Application No. PCT/US2007/022626, European Patent Office, dated May 2, 2008, 6 pages.

International Search Report corresponding to co-pending International Patent Application No. PCT/US2007/022626, European Patent Office, dated May 2, 2008, 7 pages.

\* cited by examiner

*Primary Examiner*—Sameh H. Tawfik  
(74) *Attorney, Agent, or Firm*—Nixon Peabody LLP

(57) ABSTRACT

A method of forming a reclosable fastener track having a slider. The process provides a reclosable fastener track, forms a slit in the fastener track, attaches a slider to the fastener track, seals the slit in the fastener track after the slider attaches, and creates a first and a second end stop on the track.

13 Claims, 3 Drawing Sheets

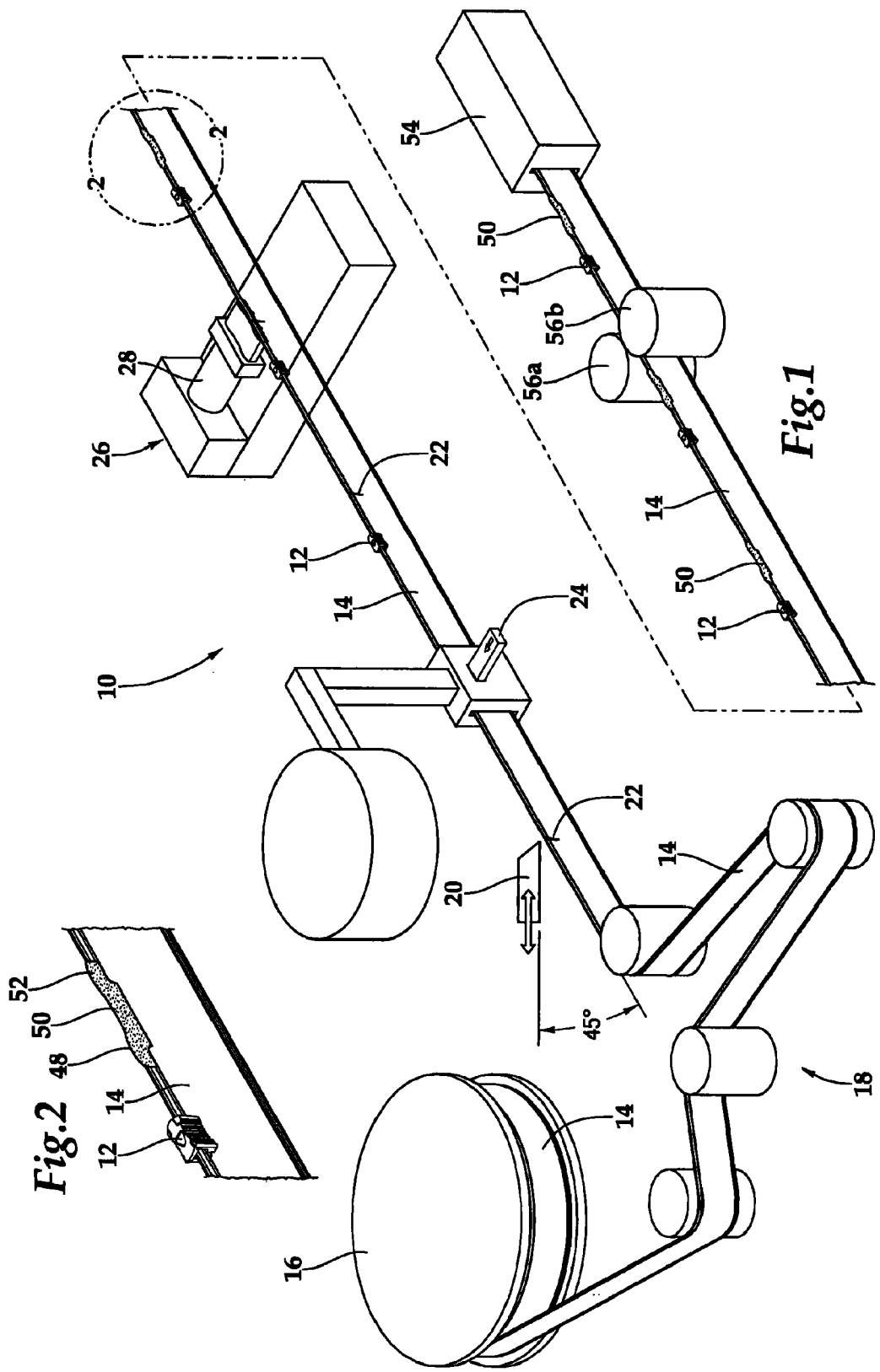

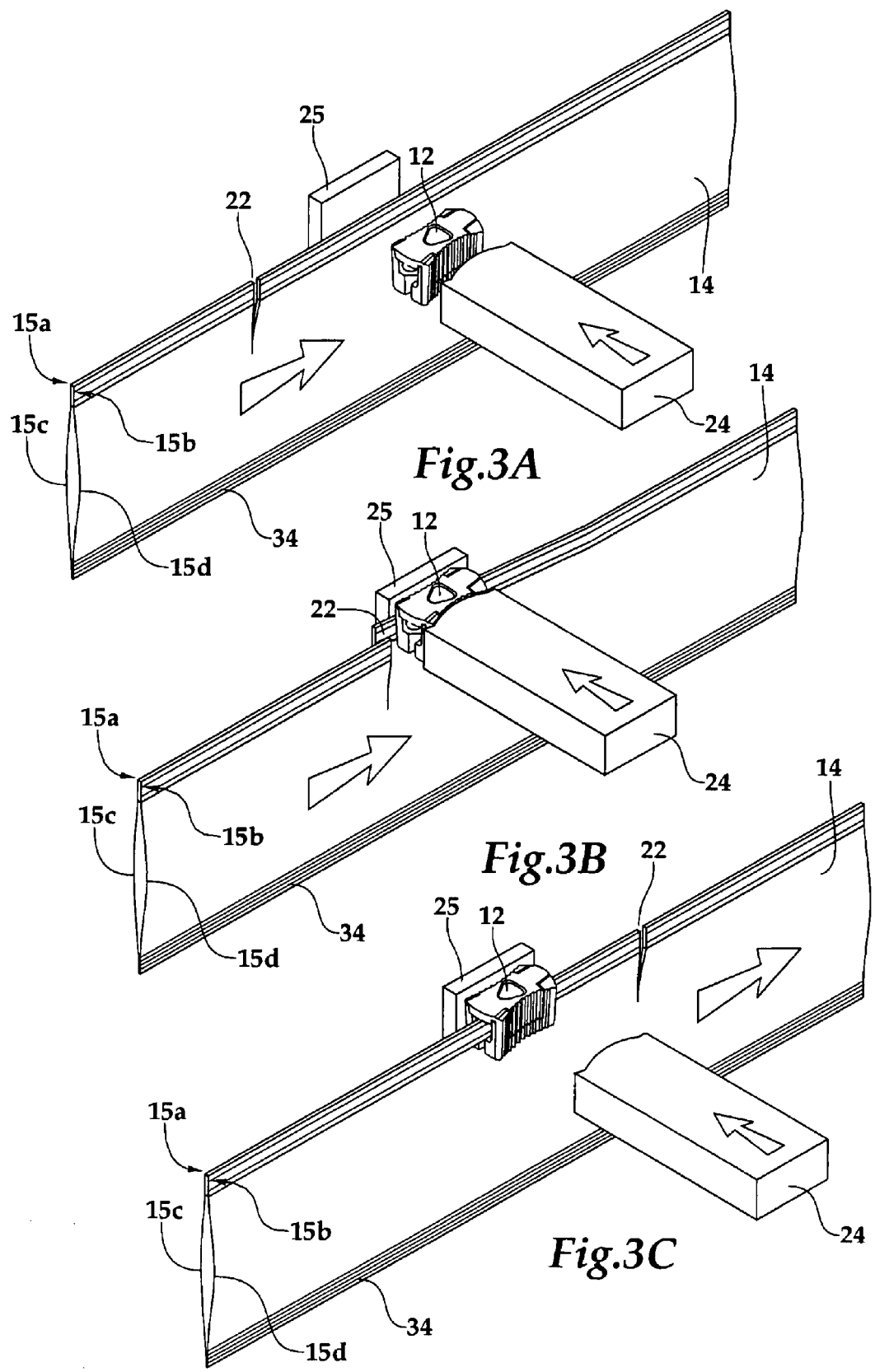

METHOD FOR FORMING A SLIDER RECLOSURE SEGMENT

CROSS REFERENCE TO RELATED APPLICATION

This application claims priority to U.S. Provisional Application Ser. No. 60/854,751 filed on Oct. 27, 2006 which is incorporated by reference in its entirety.

FIELD OF THE INVENTION

The present invention relates generally to a continuous process for making slider reclosable fastener segments that may be applied to bags, including polymeric bags, and particularly to the method of installing a slider on the polymeric track of the reclosable fastener segment.

BACKGROUND OF THE INVENTION

Polymeric bags are popular household items that are used in a variety of applications including storage of food. The addition of reclosable fastener tracks or zippers to these bags has further enhanced their utility and the addition of a slider has made the fasteners easier to open and close. The fasteners include complementary first and second profiles that engage each other to close the bag.

Previous methods of attaching a slider to the reclosable fastener track have often involved attaching a slider to a reclosable fastener track already attached to a polymeric bag, or web of film. An example of such a prior attempt is described in U.S. Pat. No. 5,431,760 to Donovan. However, it would be beneficial to attach a slider to a reclosable fastener track that is not already attached to a polymeric bag, or web of film. A need therefore exists for a method of attaching a slider to a reclosable fastener track in a continuous process prior to attaching the reclosable fastener track to a polymeric film or bag that is accomplished in an efficient and cost effective manner.

SUMMARY OF THE INVENTION

According to one process, a method of forming a reclosable fastener track having a slider is provided. The method provides a reclosable fastener track, forms a slit in the track, attaches a slider to the track, seals the slit, and creates a first and a second end stop on the track. The track has a first fin portion and a second fin portion. The first fin portion has a first profile, while the second fin portion has a second profile. The first and the second profile cooperate to form a reclosable seal. The slit forms through the profiles of the track and portions of the fins nearest to the profiles. The slider is attached over the slit in the track.

According to another process, a method of forming a reclosable fastener track having a slider is provided. The method provides a reclosable fastener track, forms a slit in the track, attaches a slider to the track, and seals the slit. The track has a first fin portion and a second fin portion. The first fin portion has a first profile, while the second fin portion has a second profile. The first and the second profile cooperate to form a reclosable seal. The slit forms through the profiles of the track and portions of the fins nearest to the profiles. The slider is attached over the slit in the track.

According to a further process, a method of forming a bag with a reclosable fastener track having a slider is provided. The method provides a reclosable fastener track, forms a slit in the track, attaches a slider to the track, seals the slit, creates a first and a second end stop on the track, attaches the fastener track to a film or bag, and forms a bag from the film. The track has a first fin portion and a second fin portion. The first fin portion has a first profile, while the second fin portion has a second profile. The first and the second profile cooperate to form a reclosable seal. The slit forms through the profiles of the track and portions of the fins nearest to the profiles. The slider is attached over the slit in the track.

According to yet another process, a method of forming, filling and sealing a bag with a reclosable fastener track having a slider is provided. The method provides a reclosable fastener track, forms a slit in the track, attaches a slider to the track, seals the slit, creates a first and a second end stop on the track, attaches the fastener track to a film or a bag after the slider attaches, forms a bag from the film, adds a product to the bag and seals the bag. The track has a first fin portion and a second fin portion. The first fin portion has a first profile, while the second fin portion has a second profile. The first and the second profile cooperate to form a reclosable seal. The slit forms through the profiles of the track and portions of the fins nearest to the profiles. The slider is attached over the slit in the track.

BRIEF DESCRIPTION OF THE DRAWINGS

FIG. 1 is a perspective view of a system adapted to place a slider on a reclosable fastener track according to one embodiment.

FIG. 2 is an enlarged perspective view of an area of the reclosable fastener track after the slider has been attached and end stops have been formed on the track.

FIGS. 3a-3c are enlarged views of the application of the slider to the track according to one embodiment.

Figure 4:
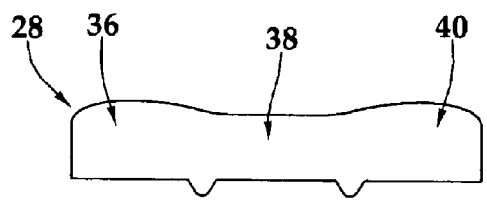
FIG. 4 is a top view of a horn used in the ultrasonic welding process of the system shown in FIG. 1.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DETAILED DESCRIPTION OF THE PREFERRED EMBODIMENTS

Referring initially to FIG. 1, there is illustrated a system 10 adapted to carry out one process to apply a slider 12 to a continuous reclosable fastener track 14. In one embodiment, the track 14 includes a first profile and a second profile. Each of the first and second profiles 15a, 15b (FIG. 3a) includes a respective fin 15c, 15d (FIG. 3a) extending generally downwardly therefrom.

It is contemplated that the first and second fin portion may be attached to form a tamper-evident closure. As shown in FIG. 3b, a tamper-evident seal 34 is formed between the first fin 15c and the second fin 15d. The profiles and fin portions may be attached in other methods to form a tamper-evident closure. One example of a tamper-evident closure is a one-time breakable preferential area of weakness. To form the one-time breakable preferential area of weakness or preferential tear area, the lower edges of the first and second fin portions 15c, 15d are joined to each other along a one-time breakable preferential area of weakness or preferential tear area to form a one-time openable tamper evident feature. The joined first and second fin portions have a generally U-shaped or V-shaped cross-sectional configuration. Other embodiments of the fastener 14 may not include the tamper evident feature leaving the fin portions disconnected. It is contemplated that other tamper-evident embodiments may be formed.

The first and the second profile of the track 14 have complementary cross-sectional shapes that are adapted to interact to form a reclosable seal on the track 14. The first and the second fin portions are adapted to attach the track 14 to a polymeric bag, or web of film, as will be described in greater detail below in reference to FIG. 6. It is to be understood that the present invention is not limited to any particular shape of a first and a second profile for the track 14, but rather any profiles that allow a reclosable seal to be formed on the track 14 are contemplated by the present invention. It is also to be understood that the present invention is not limited to any particular slider shape.

A spool 16 of reclosable fastener track 14 is provided according to one process. It is contemplated that the fastener track 14 may be stored and delivered in other manners. The track 14 is fed from the spool 16 through low-tension rollers 18 of the system 10 to alleviate the amount of tension in the track 14. The continuous length of fastener track 14 next has a slit 22 formed through the first and second profile portions as well as an area of each of the fin portions nearest the first and second profiles of the track 14 by a knife 20 or other cutting device. It is contemplated that the knife 20 may be formed of different materials. In one embodiment, the knife is nitride coated. The knife 20 is adapted to form the slit 22 at an angle of from about thirty degrees (30°) to about one hundred and fifty degrees (150°) relative to the motion of travel of the track 14. In another embodiment, the slit may be formed by a cutting device at an angle of from about 30° to about 120° or more desirably from about 45° to about 90° relative to the motion of the travel of the track 14. Providing the knife 20 or other cutting device with a forty-five degree (45°) angle relative to the direction of motion of the track 14 has been found to be most effective for an ultrasonic-welding portion of the process. Providing the knife 20 or other cutting device with a ninety degree (90°) angle relative to the motion of the track 14 has been found to be most effective for placing the slider 12 on the track.

Once the slit 22 has been formed in the reclosable fastener track 14, a slider 12 is applied to the track 14. The slider 12 is slidably mounted to the fastener track 14 for movement between a closed position and an open position. The first and second profiles 15a, 15b (FIG. 3a) are engaged to each other while the slider 12 is in the closed position. The first and second profiles 15a, 15b (FIG. 3a) are disengaged from each other in response to movement of the slider 12 from the closed position to the open position. One non-limiting example of fastener and slider arrangement is disclosed in U.S. Pat. No. 5,067,208 to Herrington, Jr. et. al.

In one process, the slider 12 is applied using a pusher 24 that places a lateral force on the slider 12 as the track 14 moves past the pusher 24. Turning to FIG. 3a, the pusher 24 applies a force to the slider 12 in a direction that is generally normal to the direction the reclosable fastener track 14 is moving. As shown in FIG. 3b, the force applied by the pusher 24 on the slider 12 causes a "leading edge" of the track 14 to displace slightly as the pusher 24 presses on the slider until a back stop 25 is reached. As shown in FIGS. 3b and 3c, when the slit 22 reaches the slider 12 and the pusher 24, the "trailing edge" portion of the track 14 nearest the slit 22 enters the slider 12 as the profile portions of the "leading edge" of the track 14 displace from the lateral force applied by the pusher 24. Once both the first and the second profiles of the track 14 have fully entered the slider 12, the pusher 24 may be withdrawn, and the slider 12 moves along with the reclosable track 14. At this stage of the process, the slider 12 is fully functional to facilitate the opening and the closing of the reclosable track; however, the slider 12 is not constrained to the track 14, and may be removed from the track if the slider 12 moves past one of the slits 22 formed on the track 14.

The pusher 24 may be actuated using pneumatics, hydraulics, a servo motor, electrical solenoid, manually operated, or by other known methods. It is contemplated that the slider may be attached over the slit using methods other than those involving a pusher.

Figure 5:
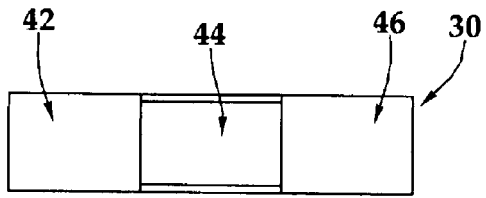
FIG. 5 is a side view of an anvil used in an ultrasonic welding process of the system shown in FIG. 1.

Next, referring back to FIG. 1, the continuous length of reclosable track 14 with the slider 12 attached enters an ultrasonic-welding area 26. Prior to entering the ultrasonic-welding area 26, the reclosable track 14 contains alternating sliders 12 and slits 22, such that each slider 12 is located between two adjacent slits 22. Within the ultrasonic welding area 26, the slit 22 is resealed and end stops or end terminations 48, 52 (FIG. 2) are formed on the track 14. It is contemplated that the end stops may be separate components that are added to the track. The ultrasonic welding area 26 includes a horn 28 and an anvil 30 (FIG. 5). The horn 28 is located on a first side of the track 14 while the anvil 30 is located on the opposite side of the track 14 as the horn 28. The horn 28 emits ultrasonic energy that melts the polymeric material of the track 14 to reseal the slit 22 and form the end stops 48, 52. It is advantageous to reseal the slit 22 to prevent the slit 22 from catching on other equipment used in additional processing, or from allowing portions of the track 14 near the slit to break off and fall into contents, if any, that are later added to a bag that has the attached track. It is further advantageous to reseal the slit 22 to allow additional tension to be placed on the track 14 without losing structural integrity of the track 14.

Turning to FIG. 4, the horn 28 is shown in greater detail. The horn 28 has three areas, a first end stop area 36, a slit resealing area 38, and a second end stop area 40. The first and second end stop areas 36, 40 project farther towards the reclosable track 14 than the slit resealing area 38.

As shown in FIG. 5, the anvil 30 of the ultrasonic welding area 26 has a first end stop area 42, a slit resealing area 44, and a second end stop area 46. The slit resealing area 44 has about a 0.020 inch gap at both a top and a bottom of the resealing area 44 relative to the height of the first and second end stop areas 42, 46. This 0.020 inch gap acts as a dam to constrain a sufficient amount of melted polymeric material to reseal the slit 22 completely. It is contemplated that the gap may vary in size. It is contemplated that other methods may be used to form an end stop and reseal the slit.

Turning to FIG. 2, the reclosable track 14 is shown after the ultrasonic welding has been performed. Following the ultrasonic welding, the track 14 has a first end stop 48, a resealed slit area 50, and a second end stop 52. The second end stop 52 shown in FIG. 2 is part of a leading reclosable track segment, while the first end stop 48 is part of a trailing reclosable track segment. Thus, the ultrasonic-welding area 26 operates on two segments of reclosable track at one time, the trailing edge of a first segment, and the leading edge of a second segment. The resealed slit area 50 is generally located between the first and the second reclosable track segment. Once the first and the second end stops 48, 52 of a given segment of reclosable track are formed the slider 12 is fully retained on the track segment.

Referring again to FIG. 1, after the ultrasonic welding is complete, the reclosable track 14 includes a fully retained slider 12. The reclosable track 14 with the slider 12 attached may then be rolled onto a spool for later use, or may be further processed. For example, the continuous reclosable track 14 with the slider 12 may be cut into individual segments that have a length of about the distance between the end stops 48, 52 on one segment of the track 14. The individual segments may be cut using knives (not shown) just past the nip rollers 56*a*, 56*b*. The nip rollers 56*a*, 56*b* providing a force to the track 14 that causes the track 14 to move. The nip rollers 56*a*, 56*b* are not required if the track 14 is being fed directly into a bag-forming device 54, as the bag-forming device 54 will provide a force necessary to move the track 14. Further, the reclosable track 14 with the slider 12 may also be fed into a device 54 for forming polymeric bags, such as a vertical form, fill, and seal device, or a horizontal form, fill, and seal device, or any other bag-making device. In vertical and horizontal form, fill, and seal processes, further processing steps may occur after attaching the slider and fastener to the film that eventually forms a bag. Product is then added to the film or bag. It is contemplated that the bag may be interconnected, or a separate bag. It is contemplated that the attached slider and fastener may be added to form a pre-made fastener bag.

One advantage of the system 10 is the ability to produce individual segments of reclosable track 14 with a slider 12 attached, while the track 14 is not attached to a bag. Therefore, track segments may be used on a wide variety of machine types, or even hand sealing operations, at an end user's facilities for attaching the track segments to bags or a web of film.

Another advantage of the system 10 is the speed of operation. The system 10 is capable of operating at speeds up to 200 cycles per minute, while many previous machines may only apply sliders at speeds of up to 130 cycles per minute. Utilizing ultrasonic welding to form the end stops 48, 52 typically reduces the operating speed of the system 10 below the 200 cycles per minute that the system 10 is capable of applying sliders 12 to the track 14.

Figure 6:
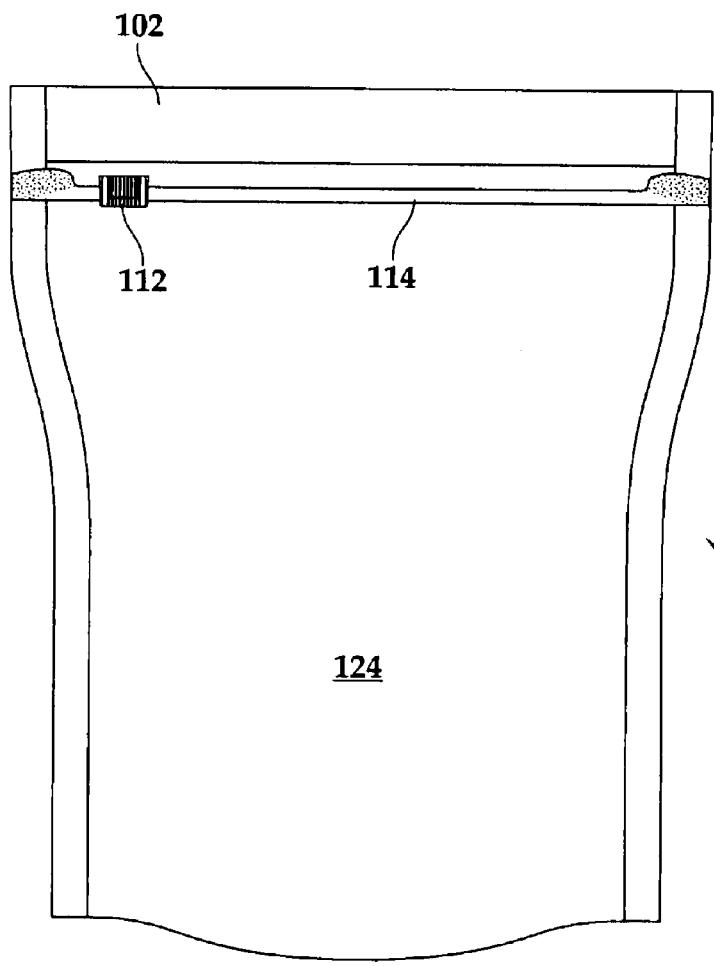
FIG. 6 is a front side view of a polymeric bag having a reclosable fastener track and slider.
Figure 7:
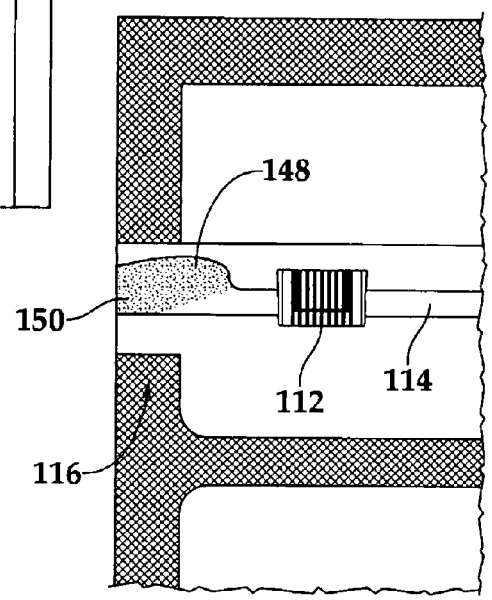
FIG. 7 is an enlarged view of a first end of the reclosable fastener track and slider of the bag of FIG. 6.

Turning next to FIG. 6, a polymeric bag 100 having a segment of reclosable track 114 with a slider 112 is shown. The bag 100 includes a pair of opposing wall panels that make up a package body and define a receptacle space for products. The opposing wall panels may comprise polymeric film, multilayer and multi-component laminations or coextrusions. The bag 100 is a hooded bag, in that it has an area 102 above the reclosable track 114. The reclosable track is attached to the bag 100 along fin portions 116 of the reclosable track 114. The fin portion 116 attaches to the bag 100 via conventional methods, such as, for example, a heat-sealing process. The fin portions 116 of the reclosable track 114 are made of a barrier material that prevents or inhibits air from entering the bag 100. The bag 100 may be formed via a horizontal form, fill, and seal process, a vertical form, fill, and seal process, or any other bag-forming process known in the art. Supplying a segment of reclosable track affords a user a great deal of flexibility in the bag-forming process.

Different products may be added in a form, fill and seal operations. For example, nuts, candy, snacks, salt, cheese, other food and non-food products may be packed in these packages by form, fill and seal machines and sold to consumers.

The bag 100 may be formed by folding a web of material, such as polymeric film, multilayer and multi-component laminations or coextrusions consisting of polymer, paper, metalized polymer or foil in any combination. The folded web forms the package body and defines the receptacle space bounded by the opposing wall panels and a package bottom. After the fastener 14 with slider 12 is attached to the wall panel, a vertical seal bar joins the wall panels together to form a side seal at defines a side wall of the recloseable package. The distance between adjacent side seals should be approximately equal to the desired width of the recloseable package. The side seal may be formed by heat seal, adhesive or any other appropriate method to form a strong preferably hermetic seal. The product may directed into the package by a funnel.

After the product fills the package, a second top seal bar adheres the fastener 14 to the other wall panel preferably hermetically sealing the product within the package. The second top seal bar moves back and forth to provide a second top seal that adheres the second track to the wall panel. The second top seal between the wall panel and second track. The fastener may be adhered to the wall panels of the web by heat seal, adhesive or any other appropriate method to form a strong preferably hermetic second top seal. To divide the adjacent packages of product that are connected by the side seal in one process, a knife cuts the side seal such that the side walls of each package remain secure. It is contemplated that the fastener 14 may be attached to a formed bag instead of an interconnected bag.

In another embodiment of the form, fill and seal process, a side seal may be cut before filling the package with the product. In this embodiment, the process folds the web and positions and top seals the fastener 14 to one of the wall panels. Next, the process forms and cuts the side seals. After the knife cuts the side seals, the product fills the package and the second top seal closes the package. In another embodiment of the form, fill and seal process, the fastener may be sealed to one of the wall panels prior to the folding of the web.

According to another process, end stops on individual track segments may be formed by a process other than ultrasonic-welding, such as, for example, a heat-sealing process.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of forming a continuous reclosable fastener track having a plurality of sliders for attaching to a film for forming a bag, the method comprising the acts of:

providing a reclosable fastener track, the track having a first fin portion and a second fin portion, the first fin portion having a first profile and the second fin portion having a second profile, the first and the second profile cooperating to form a reclosable seal;

forming a plurality of slits in the track, the plurality of slits being formed through the profiles of the track and portions of the fins nearest the profiles;

attaching a plurality of sliders to the track, the plurality of sliders attaching over a respective one of the slits in the track;

sealing the plurality of slits in the track creating a plurality of resealed areas; and creating a plurality of first end stops and a plurality of second end stops on the track at or near a respective one of the resealed areas, after creating the plurality of resealed areas in the track and creating the plurality of first and second end stops on the track, attaching the continuous reclosable fastener track to a film for forming a bag.

2. The method of claim 1, wherein the act of creating the plurality of first end stops and the second end stops utilizes ultrasonic-welding.

3. The method of claim 2, wherein the sealing of the slits is performed utilizing ultrasonic welding and the acts of sealing the slits in the track and creating the first end stops and the second end stops are performed using a single ultrasonic-welding process.

4. The method of claim 1, wherein the act of attaching the sliders to the track includes utilizing a pusher that holds the sliders and applies a lateral force on the track, the lateral force displacing the track as the slits approach the holder allowing the sliders to attach to the track.

5. The method of claim 1, wherein the act of forming the slits includes forming the slits at an angle of at from about a thirty degrees to about a ninety degrees relative to the direction of motion of the reclosable fastener track.

6. The method of claim 5, wherein the act of forming the slits forms the slits at an angle of about thirty-five degrees to an angle of about fifty-five degrees relative to the direction of travel of the reclosable fastener track.

7. The method of claim 1 further comprising the act of cutting the fastener track at about the location of the resealed area providing segments of reclosable fastener track having a slider, a first end stop, and a second end stop.

8. The method of claim 1, wherein the fastener track comprises polymeric materials.

9. A method of forming a continuous reclosable fastener track having a plurality of sliders for attaching to a film for forming a bag, the method comprising the acts of:

providing a reclosable fastener track, the track having a first fin portion and a second fin portion, the first fin portion having a first profile and the second fin portion having a second profile, the first and the second profile cooperating to form a reclosable seal;

forming a plurality of slits in the track, the plurality of slits being formed through the profiles of the track and portions of the fins nearest the profiles;

attaching a plurality of sliders to the track, the plurality of sliders attaching over a respective one of the slits in the track; and sealing the plurality of slits in the track creating a plurality of resealed areas;

after creating the plurality of resealed areas in the track, attaching the continuous reclosable fastener track to a film for forming a bag.

10. The method of claim 9, wherein the act of attaching the plurality of sliders to the track includes utilizing a pusher that holds the plurality of sliders and applies a lateral force on the track, the lateral force displacing the track as the slits approach the holder allowing the plurality of sliders to attach to the track.

11. The method of claim 9, wherein the act of forming the slits includes forming the slits at an angle of at from about a thirty degrees to about a ninety degrees relative to the direction of motion of the reclosable fastener track.

12. The method of claim 11, wherein the act of forming the slits forms the slits at an angle of about thirty-five degrees to an angle of about fifty-five degrees relative to the direction of travel of the reclosable fastener track.

13. The method of claim 9, wherein the sealing the slits is performed utilizing ultrasonic welding.

\* \* \* \* \*